United States Patent
Goto et al.

(10) Patent No.: US 7,529,810 B2
(45) Date of Patent: May 5, 2009

(54) DDNS SERVER, A DDNS CLIENT TERMINAL AND A DDNS SYSTEM, AND A WEB SERVER TERMINAL, ITS NETWORK SYSTEM AND AN ACCESS CONTROL METHOD

(75) Inventors: Hironori Goto, Kurume (JP); Akihiro Nawata, Kasuga (JP); Michihiro Muta, Fukuoka (JP)

(73) Assignee: Panasonic Corporation, Osaka (JP)

( * ) Notice: Subject to any disclaimer, the term of this patent is extended or adjusted under 35 U.S.C. 154(b) by 667 days.

(21) Appl. No.: 10/390,238

(22) Filed: Mar. 17, 2003

(65) Prior Publication Data

US 2003/0177236 A1 Sep. 18, 2003

(30) Foreign Application Priority Data

Mar. 18, 2002 (JP) ............... P.2002-073621
Mar. 18, 2002 (JP) ............... P.2002-073622

(51) Int. Cl.
*G06F 15/16* (2006.01)
(52) U.S. Cl. ............... 709/219; 709/225; 709/242
(58) Field of Classification Search ............... 709/219, 709/225, 242; 726/2, 6, 8, 12, 28–29
See application file for complete search history.

(56) References Cited

U.S. PATENT DOCUMENTS 5,758,282 A * 5/1998 Yamashina et al. ........... 455/428
5,854,901 A * 12/1998 Cole et al. ................. 709/245
5,898,830 A 4/1999 Wesinger, Jr. et al.

(Continued)

FOREIGN PATENT DOCUMENTS

JP 2001-238192 8/2001

(Continued)

OTHER PUBLICATIONS

Irie et al. (Kazunari Irie, Suguru Mukaino, and Hirokazu Nakagawa: "Dynamic DNS for Regional PC Communication System and its Implementation," Electronics and Communications in Japan, part 2 vol. 84, No. 2 Jan. 23, 2001).*

(Continued)

*Primary Examiner*—William C Vaughn, Jr.
*Assistant Examiner*—Mohamed Ibrahim
(74) *Attorney, Agent, or Firm*—Pearne & Gordon LLP

(57) ABSTRACT

The present invention aims at providing a DDNS server, a DDNS client terminal and a DDNS system which maintains high security while using DHCP and allows an access to terminals having the same IP address as well as data updates. The DDNS server includes a terminal management table storing the domain name, global IP address and port number of a DDNS client terminal, characterized in that the terminal management section checks whether a same global IP address is present in the terminal management table when a request to overwrite a global IP address is made from a DDNS client terminal and, in case the same global IP address is absent, permits overwriting of the global IP address, and in case the same global IP address is present, checks the port number, and in case the same port number is detected, inhibits overwriting of the global IP address, and in case the port number is different, permits overwriting of the global IP address.

11 Claims, 12 Drawing Sheets

U.S. PATENT DOCUMENTS

| | | | |
|---|---|---|---|
| 6,088,725 | A | 7/2000 | Kondo et al. |
| 6,226,684 | B1 * | 5/2001 | Sung et al. .................. 709/238 |
| 6,519,625 | B1 * | 2/2003 | Murrell et al. .............. 709/202 |
| 6,556,574 | B1 * | 4/2003 | Pearce et al. ................ 370/401 |
| 6,608,830 | B1 * | 8/2003 | Hirano et al. ............... 370/351 |
| 7,031,275 | B1 * | 4/2006 | Borella et al. ............... 370/328 |
| 7,075,897 | B2 * | 7/2006 | Uematsu .................... 370/255 |
| 2003/0172155 | A1 * | 9/2003 | Kim .......................... 709/224 |
| 2005/0152287 | A1 * | 7/2005 | Yokomitsu et al. .......... 370/255 |

FOREIGN PATENT DOCUMENTS

| | | |
|---|---|---|
| JP | 2001-306520 | 11/2001 |
| JP | 2002-026954 | 1/2002 |
| JP | 2002-064523 | 2/2002 |

OTHER PUBLICATIONS

"Address IP Works", 1988, XP-002129978, 4 pages.
Richard D. Verjinski, "Phase, A Portable Host Access System Environment", Oct. 15, 1989, Unisys. Defense Systems, pp. 0806-0809.
Kazunari Irie and Norishisa Ohta, "A New Dynamic DNS for Regional PC Communication Network System", XP-000829450, 1999, pp. 330-337.
Samdarshi Pali, Setting Up Web Services Using Dynamic Domain Name Server (DDNS), XP-002238057, Jul. 28, 2001, 3 pages.
Nakajima, "Web Server Construction Technique (No.3), Let's Try to Use Virtual Host", Linux Magazine, vol. 1, No. 2, pp. 197-202, ASCII Corporation, Nov. 1, 1999.
Japanese Office Action dated Sep. 5, 2006.

* cited by examiner

FIG. 3A

| | AUTHENTICATION INFORMATION | DOMAIN NAME | GLOBAL IP ADDRESS | PORT NUMBER |
|---|---|---|---|---|
| SERVER | – | xx.ne.jp | 222.222.111.111 | (WELL KNOWN) |
| ROUTER | – | xx.ne.jp | 222.222.222.222 | (WELL KNOWN) |
| IMAGE PICKUP TERMINAL a | 11:22:33:44:55:66 | 11.xx.ne.jp | 222.222.222.222 | 800 |
| IMAGE PICKUP TERMINAL b | 22:33:44:55:66:77 | 11.xx.ne.jp | 222.222.222.222 | 8000 |
| PC TERMINAL | 33:44:55:66:77:88 | xx.ne.jp | 222.222.111.222 | 888 |

| AUTHENTICATION INFORMATION | DOMAIN NAME | GLOBAL IP ADDRESS | PORT NUMBER | UPDATE INTERVAL |
|---|---|---|---|---|
| 11:22:33:44:55:66 | 11.xx.ne.jp | 222.222.222.222 | 800 | 10 MINUTES |

MANAGEMENT TABLE 24

| HOST NAME | IP ADDRESS |
|---|---|
| tarou.miemasu.net | 1.1.1.1 |
| hanako.miemasu.net | 1.1.1.2 |
| ⋮ | ⋮ |

24a — HOST NAME column
24b — IP ADDRESS column

FIG. 11B

IP PACKET

| IP | TCP | DATA |

HTTP REQUEST

HEADER:
GET http://tarou.minemasu.net/HTTP/1.0
Accept: */*

User-Agnet: Mozilla/4.0
Host: tarou.minemasu.net
⋮

CRLF

MESSAGE BODY

DDNS SERVER, A DDNS CLIENT TERMINAL AND A DDNS SYSTEM, AND A WEB SERVER TERMINAL, ITS NETWORK SYSTEM AND AN ACCESS CONTROL METHOD

BACKGROUND OF THE INVENTION

1. Field of the Invention

The invention relates to a DDNS (Dynamic Domain Name System) server and a DDNS client terminal as its client, and a DDNS system comprising the server and the terminal.

The invention also relates to a web server terminal which permits an access only when a registered host name matches a received host name and its network system, and an access control method for detecting a host name to determine whether to permit an access.

2. Description of the Related Art

In recent years, the internet has attained a widespread use. Various web pages are registered on a server on the internet and internet users can acquire a variety of information more easily and readily than ever.

It is necessary to specify the global IP address of a server on the internet before accessing the server on the internet. However, the global IP address is difficult for the user to understand, so that a domain name (DNS name) is used in general. The domain name is managed by the DNS server through mapping a host name (domain name) of a unit such as a server to a global IP address. In general, a global IP address and a host name are communicated from a unit such as a server to a DNS server, and the global IP address and the host name are registered and managed by the DNS server.

The operation of an access to a server unit registered to a DNS server by using a domain name will be described. When a domain name is input to browser means used to access a unit, the global IP address corresponding to the domain name is inquired of a DNS server. The DNS server, on the inquiry, returns the corresponding global IP address to the accessing browser means, which uses this global IP address to communicate with the server unit.

The global IP address is assigned by an ISP. The global IP address is either statically or dynamically assigned to an ISP client. In general, in order to assign limited global IP addresses to as many clients as possible, a global IP address is often dynamically assigned. As means for assigning a global IP address, the DHCP (Dynamic Host Configuration Protocol) is used.

By way of the DHCP, a DHCP client requests assignment of a global IP address from a DHCP server on connection to a network or power ON to receive assignment of a global IP address from a DHCP server. The global IP address is assigned by a DHCP server for a predetermined period. Without a repeated assignment request by the DHCP client, assignment of a global IP address to the DHCP client is no longer valid. In general, a DHCP client makes an IP address assignment request again in the available period of the global IP address communicated by the DHCP server as long as the DHCP remains connected to the network. Thus the global IP address of a DHCP client does not become invalid in this context. However, in case the power is turned off or connection to the network is terminated, the global IP address once assigned becomes invalid and a global IP address assignment request must be made again. In this practice, a new global IP address may be different from the previously acquired global IP address. Further, some DHCP servers do not necessarily assign the same global IP address in response to a second assignment request.

Thus, the permanent DNS cannot support a DHCP client whose global IP address dynamically changes.

In recent years, dynamically changing global IP address and host name have been managed using the DDNS. In the DDNS, a DDNS server registers/manages a global IP address and a domain name communicated from a client on a regular basis. This avoids any inconsistency between the actual state taking place when a related art DNS and DHCP are used and the information registered to the DDNS. In DDNS, some problems remain in case an IP address is dynamically assigned by a DHCP server as mentioned below.

Inconsistency between the actual state and the registered information persists for a short period until the update in response to a regular notice from a client to a DDNS server. A related art DDNS system will be described. FIG. 6 is a block diagram of a related art DDNS system. FIG. 7A is a time chart of connection updates in a related art DDNS. FIG. 7B is a time chart of the registration of a terminal management table and IP address usage by DHCP in a related art DDNS. In FIG. 6, a numeral 1 represents the internet, 2a, 2b, 2' PC terminals, 3, 3' servers as a window of domain such as web servers and mail servers, 4 a DHCP server which assigns IP addresses to PC terminals 2a, 2b in the domain of the server 3, 5a DDNS server which converts an access destination domain name (hereinafter a domain name includes a sub-domain name) to a global IP address on an access from the PC terminals 2a, 2b, 5a a terminal management table for managing terminals provided on the DDNS server 5, and 8 a DNS server.

A sequence of internet connection using the related art DDNS system and updates of DDNS is described below. In FIG. 7A, at time T1, the PC terminal 2a of User A connects to the internet by way of power ON or circuit connection, is assigned a global IP address '222.222.222.222' by the DHCP server 4, and starts internet connection. The PC terminal 2a assigned a global IP address communicates the assigned global IP address and its domain name (domain name 'aa.xx.ne.jp' of the PC terminal registered to the DDNS server 5 beforehand) to the DDNS server 5. The DDNS server 5, in response to this, updates the mapping of global IP addresses to domain names.

At time T2, the PC terminal 2a turns off the power or releases circuit connection to release internet connection. The global IP address '222.222.222.222' is released.

At time T3, the PC terminal 2b of User B connects to the internet by way of power ON or circuit connection, is assigned a global IP address '222.222.222.222' by the DHCP server 4, and starts internet connection. The PC terminal 2b communicates the assigned global IP address and its domain name ('bb.xx.ne.jp') to the DDNS server 5. The DDNS server 5 updates the registration. In this state, at time t4, the PC terminal 2a starts internet connection again. The PC terminal 2a is assigned an IP address '222.222.222.111' by the DHCP server 4. The PC terminal 2a communicates the assigned global IP address and its domain name ('aa.xx.ne.jp') to the DDNS server 5. The DDNS server 5 updates the registration. At time T5, the pp 2b releases internet connection. At time T6, the second connection of the PC terminal 2a is released.

In the aforementioned connection sequence, as long as the DHCP server 4 is used, the same global IP address could be registered to the PC terminal 2a and 2b, as shown in FIG. 7B. That is, the terminal address ('aa.xx.ne.jp') and the global IP address '222.222.222.222' are registered in the information area of the PC terminal 2a in the terminal management table 5a at time T1. The global IP address is released at time T2 although the registered information of the PC terminal 2a in the terminal management table 5a is maintained until the time T4 the global IP address changes.

The global IP address '222.222.222.333' on the last access is recorded in the information area of the PC terminal 2*b* in the terminal management table 5*a* at time T3. In case User 3 makes an access at this point in time T3, the DHCP server 4 assigns the global IP address '222.222.222.222' which has just become vacant to the PC terminal 2*b*, and registers '222.222.222.222' to the terminal management table 5*a*. From time T3 to time T4, the same global IP address '222.222.222.222' is assigned as a global IP address to two different terminal addresses 'aa.xx.ne.jp' and 'bb.xx.ne.jp' in the terminal management table 5*a*. In this state, in case an access is made using the terminal address 'aa.xx.ne.jp' from an external PC terminal 2' to the PC terminal 2*a*, the DDNS server 5 transmits data by using the global IP address '222.222.222.222' which establishes a connection to the PC terminal 2*b*. The user of the external PC terminal 2' who attempted to access the PC terminal 2*a* cannot access the PC terminal 2*a* but accesses the unintended PC terminal 2*b*. This also violates privacy and causes a security problem. While in DDNS, the global IP address of the PC terminal 2*a* is updated to '222.222.222.111' at time T5 and double registration will not take place afterwards, such double registration could occur at least until update is complete. For DNS, the period of double registration is longer than that in the DDNS because of absence of regular updates. Some DHCP servers do not necessarily assign the same global IP address in response to a second assignment request even in case internet connection is not released. Further, a request to update the DDNS server 5 is made at regular intervals. The problem of double registration occurs in this case also.

In order to eliminate the danger of double registration, the same global IP address must not issued to the PC terminals 2*a*, 2*b*. However, making a restriction so as not to issue the same global IP address presents a problem. In a case where a plurality of terminals are locally connected to a router connected to the internet, these terminals share the same global IP address and separate domain names cannot be assigned to these plurality of terminals. As a result, only a single terminal can be connected to a DDNS server.

FIG. 8 is a block diagram of a DDNS system comprising a related art terminal connected to the internet via a router. In FIG. 8, a numeral 1 represents the internet, 2' a PC terminal, 3' a server as a window of domain such as a web server and a mail server connected to the internet 1, 4 a DHCP server which assigns an IP address in the domain of the server 3, 5 a DDNS server, and 5*a* a terminal management table for managing terminals provided on the DDNS server 5. Numerals 6*a*, 6*b* represent a plurality of image pickup terminals, 7 a router equipped with the image pickup terminals 6*a*, 6*b* to allow an access from outside on a port forward basis, and 8 a DNS server.

As shown in FIG. 8, in a related art DDNS system comprising a terminal connected via a router, the router 7 is assigned an IP address '222.222.222.222' by the DHCP server 4. This does not allow the system to recognize the image pickup terminals 6*a*, 6*b*. Thus port numbers are given to the image pickup terminals 6*a*, 6*b*. For example, the image pickup terminal 6*a* is assigned a port number '800' and the image pickup terminal 6*b*'8000'. The image pickup terminal 6*a* identifies itself using the IP address '222.222.222.222' and the port number '800' while the image pickup terminal 6*b* identifies itself using the IP address '222.222.222.222' and the port number '8000'. The URL of the image pickup terminal 6*a* is 'http//222.222.222.222:800/' and the URL of the image pickup terminal 6*b* is 'http//222.222.222.222:8000/'.

To access the image pickup terminal 6*a* from outside via the internet, '222.222.222.222' as a destination IP address and '800' as a port number are written into the IP header, then an IP packet is transmitted to the network. The router 7 having the IP address '222.222.222.222' receives this packet and transfers it into the domain because of port forward sequence. The packet is then received by the image pickup terminal 6*a* having the port number '800'. Similarly, an IP packet can be transmitted to the image pickup terminal 6*b* by using the port number '8000'.

In this way, in an access to the image pickup terminals from outside, a same IP address is used to identify both image pickup terminals 6*a*, 6*b*. In case a restriction is applied so as not to issue a same IP address in order to avoid the problem of double registration mentioned earlier, only either the image pickup terminal 6*a* or image pickup terminal 6*b* can be registered to the DDNS server 5.

As mentioned in the preceding paragraphs, a same IP address could be registered to two image pickup terminals 6*a*, 6*b* in a related art DDNS system as long as the DHCP server 4 is used. When an access is made by an external terminal in this state, the DDNS server 5 transmits data to this IP address, which causes the terminal to be connected to the PC terminal 2*b* instead of the target PC terminal 2*a*. Although this occurs for a short interval, the user's privacy is not protected and this system is imperfect in terms of security. In case a restriction is applied so as not to issue a same IP address to the PC terminals 2*a*, 2*b* in order to eliminate the possibility of double registration, only one of a plurality of terminals (for example image pickup terminals 6*a*, 6*b*) locally connected to a router unit, if any, can be registered to the DDNS server 5.

SUMMARY OF THE INVENTION

The invention aims at providing a network system which can avoid the problem of privacy protection by solving the aforementioned problem of double registration for a terminal which is dynamically assigned a global IP address by the ISP using the DHCP.

In order to solve the problem, a DDNS server of the invention comprises a terminal management table storing the domain name, global IP address and port number of a DDNS client terminal and a terminal management section for managing the terminal management table, characterized in that the DDNS server receives a domain name, a global IP address and a port number transmitted from the DDNS client terminal in accordance with an update request from the DDNS client terminal and overwrites the terminal management table.

With this configuration, it is possible to solve the problem of double registration for a terminal to which the ISP can use the DHCP to dynamically assign a global IP address thereby avoiding the problem of privacy protection. It is also possible to register a plurality of terminals having the same IP address such as terminals locally connected to a router so that separate accesses to the terminals may be allowed, and perform data updates.

A DDNS server of the invention comprises a terminal management table storing the domain name, global IP address and port number of a DDNS client terminal, characterized in that the terminal management section checks whether a same global IP address is present in the terminal management table when a request to overwrite a global IP address is made from a DDNS client terminal and, in case the same global IP address is absent, permits overwriting of the global IP address, and in case the same global IP address is present, checks the port number, and in case the same port number is detected, inhibits overwriting of the global IP address, and in case the port number is different, permits overwriting of the global IP address.

With this configuration, it is possible to solve the problem of double registration for a terminal to which the ISP can use the DHCP to dynamically assign a global IP address thereby avoiding the problem of privacy protection. It is also possible to register a plurality of terminals having the same IP address so that separate accesses to the terminals may be allowed, and perform data updates.

A DDNS client terminal of the invention is characterized in that the DDNS client terminal comprises a DDNS management table storing a domain name, a global IP address, a port number and update interval information and DDNS management means for managing the DDNS management table and periodically updating the global IP address and/or domain name in accordance with the update interval information.

With this configuration, it is also possible to register a plurality of terminals having the same IP address so that separate accesses to the terminals may be allowed, and perform data updates.

A DDNS system of the invention comprises the DDNS server, the DDNS client terminal and a DHCP server, characterized in that the DDNS system checks whether a same global IP address is present in the domain when a request to overwrite a global IP address is made from the DDNS client terminal to the DDNS server and, in case the same global IP address is absent, permits overwriting of the global IP address, and in case the same global IP address is present, checks the port number, and in case the same port number is detected, inhibits overwriting of the global IP address, and in case the port number is different, permits overwriting of the global IP address.

With this configuration, it is possible to solve the problem of double registration for a terminal to which the ISP can use the DHCP to dynamically assign a global IP address thereby avoiding the problem of privacy protection. It is also possible to register a plurality of terminals having the same IP address so that separate accesses to the terminals may be allowed, and perform data updates.

A web server terminal of the invention comprises a management table for storing its own host name, host name detection means for extracting a host name from an HTTP header on receipt of an access request, and determination means for comparing the host name detected by the host name detection means with the host name stored in the management table and checking whether they match each other, characterized in that the determination means allows web processing means to perform communications in case the host names match each other, and rejects communications in case the host names do not match each other.

With this configuration, it is possible to readily and reliably prevent erroneous connection even in the presence of double registration of an IP address, thereby enhancing security.

A network system of the invention comprises a web server terminal, a web client terminal, a DDNS server, and a DHCP server for assigning an IP address, characterized in that the web client terminal appends a host name to an access request and that the web server terminal compares the host name with the registered host name and permits connection only in case the host names match each other.

With this configuration, it is possible to readily and reliably prevent erroneous connection even when an IP address is double-registered, thereby enhancing security.

An access control method of the invention is characterized in that the web client terminal sets a host name to an access request in accessing the web server terminal by way of browser means and that the web server terminal extracts the host name, compares the host name with the registered host name, and permits connection in case the host names match each other and rejects connection in case the host names do not match each other.

With this configuration, it is possible to readily and reliably prevent erroneous connection even when an IP address is double-registered, thereby enhancing security.

BRIEF DESCRIPTION OF THE DRAWINGS

FIG. 3A shows a terminal management table of a DDNS server according to Embodiment 1 of the invention;

FIG. 3B shows a DDNS management table of an image pickup terminal according to Embodiment 1 of the invention;

FIG. 11A is a main section of the management table of a web server terminal according to Embodiment 2 of the invention;

FIG. 11B is a block diagram of an access request according to Embodiment 2 of the invention.

DESCRIPTIONS OF THE PREFERRED EMBODIMENTS

Embodiment 1

Figure 1:
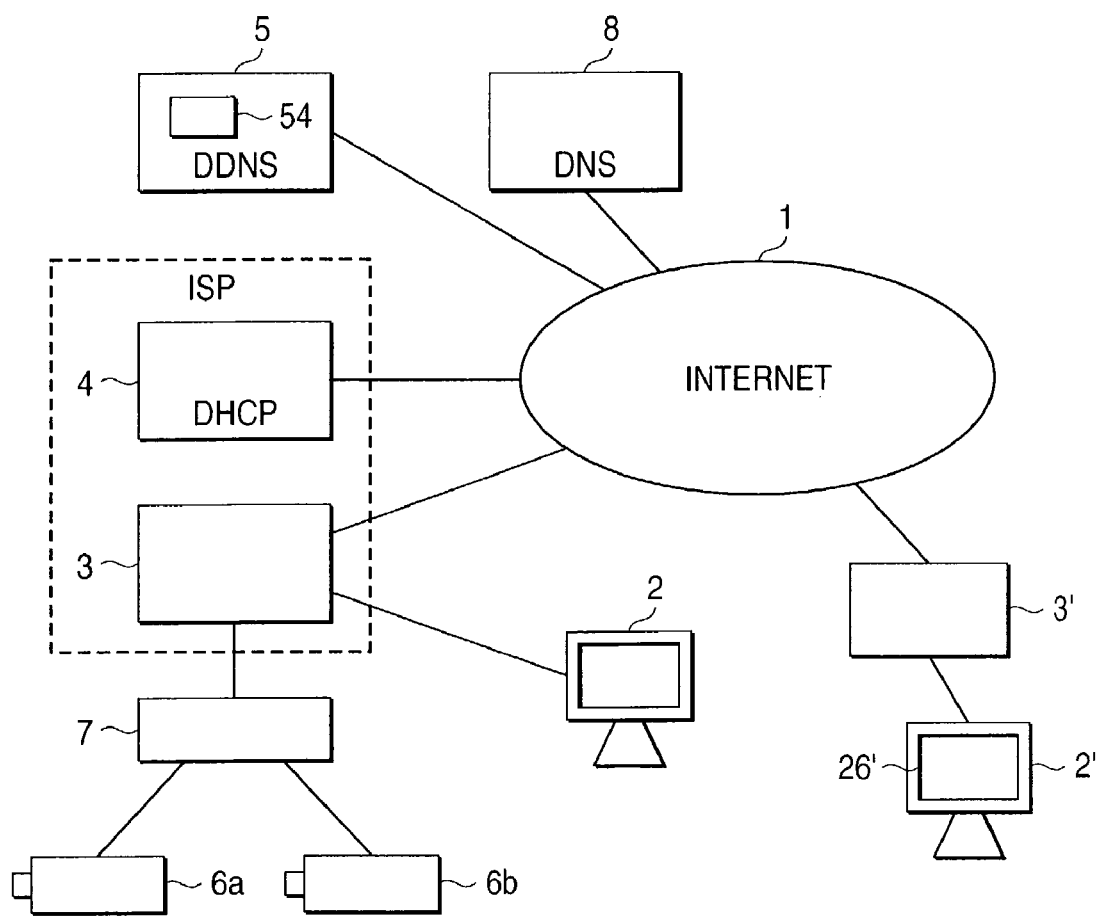
FIG. 1 is a block diagram of a DDNS system according to Embodiment 1 of the invention.
Figure 2C:
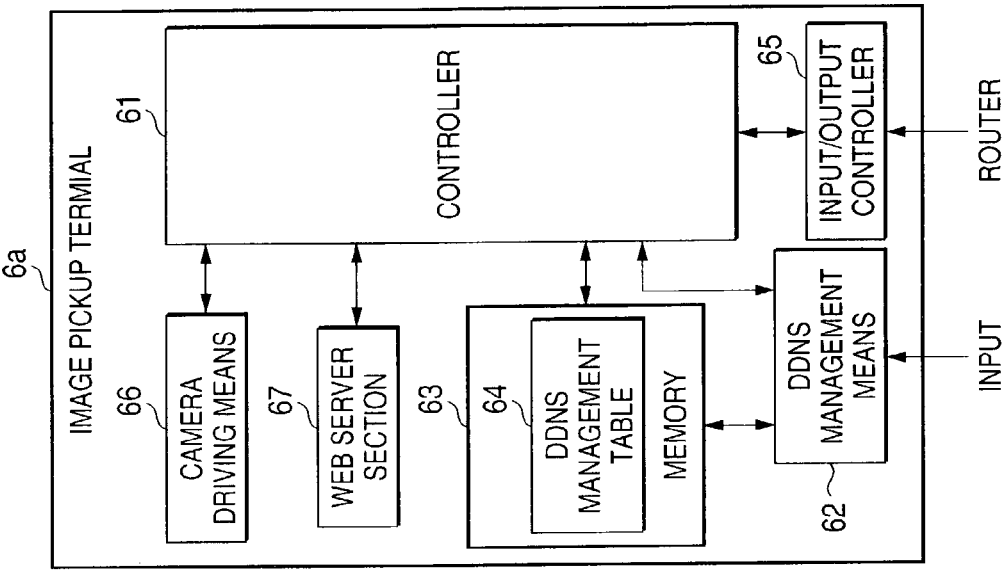
FIG. 2C is a block diagram of an image pickup terminal as a DDNS client terminal according to Embodiment 1 of the invention.
Figure 2B:
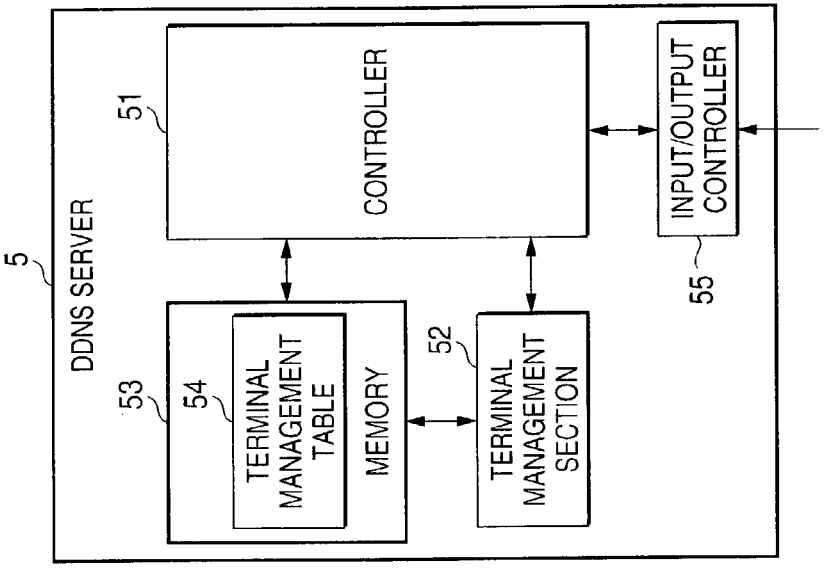
FIG. 2B is a block diagram of a DDNS server according to Embodiment 1 of the invention.
Figure 2A:
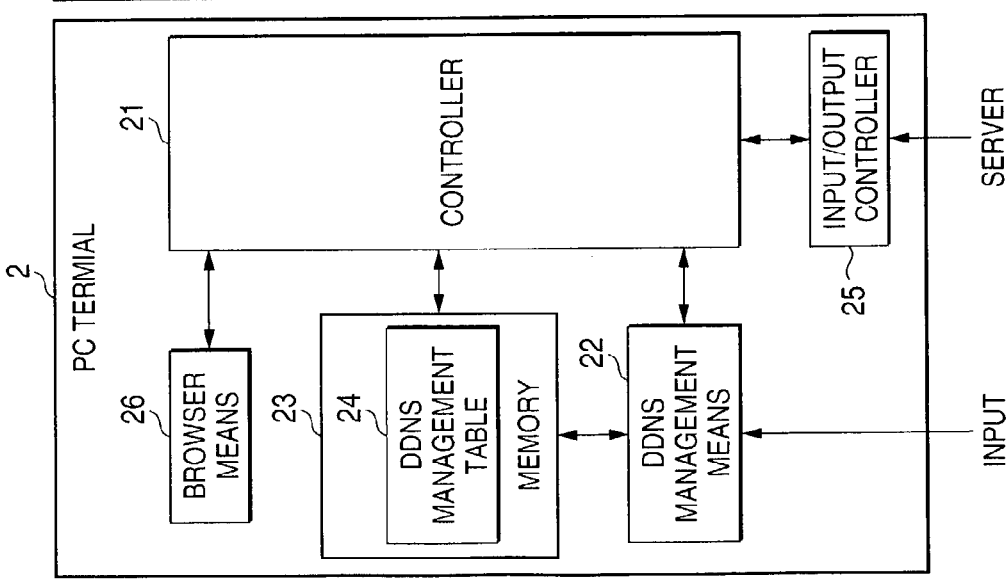
FIG. 2A is a block diagram of a PC terminal as a DDNS client terminal according to Embodiment 1 of the invention.
Figure 4:
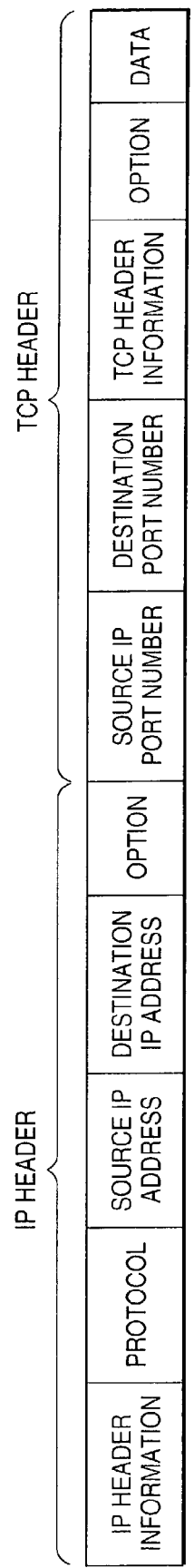
FIG. 4 is an IP packet block diagram of a DDNS system according to Embodiment 1 of the invention.
Figure 5A:
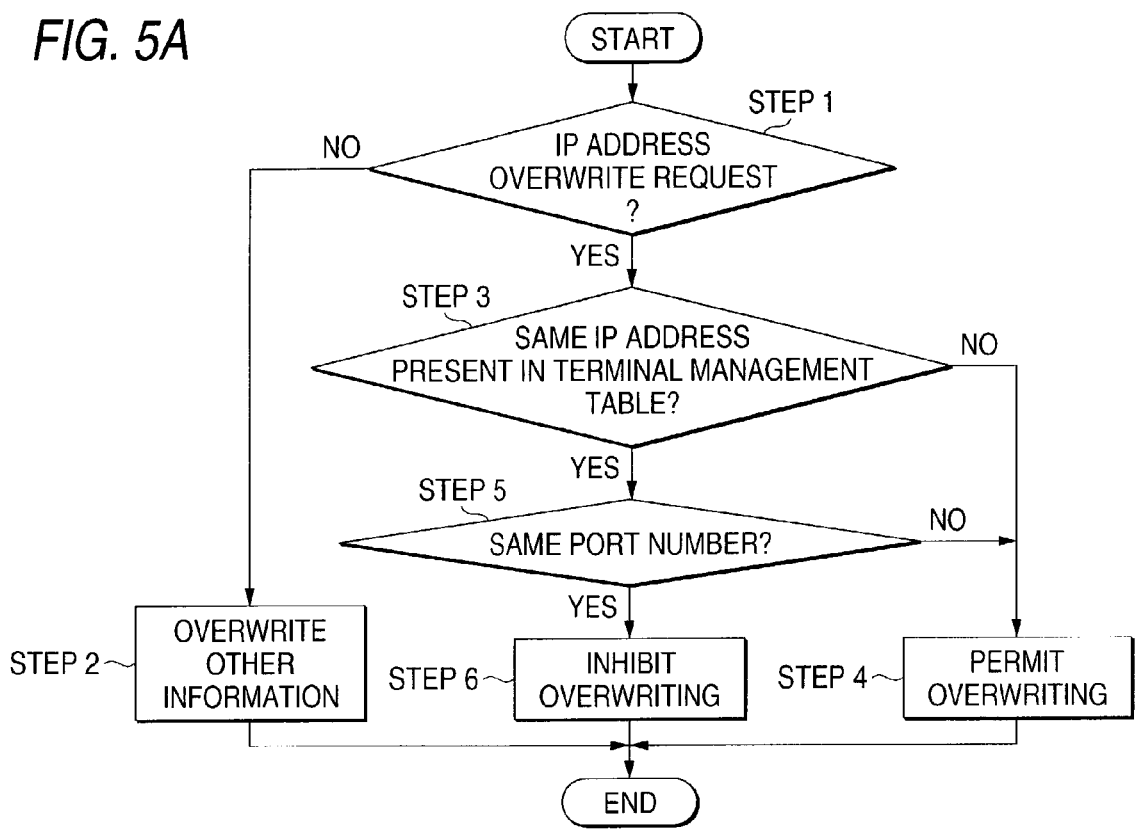
FIG. 5A is a flowchart of updating a DDNS server according to Embodiment 1 of the invention.
Figure 5B:
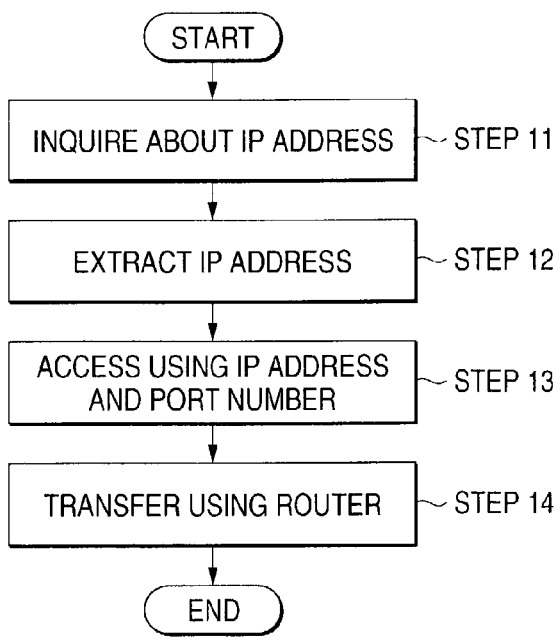
FIG. 5B is a flowchart of accessing a DDNS server according to Embodiment 1 of the invention.
Figure 6:
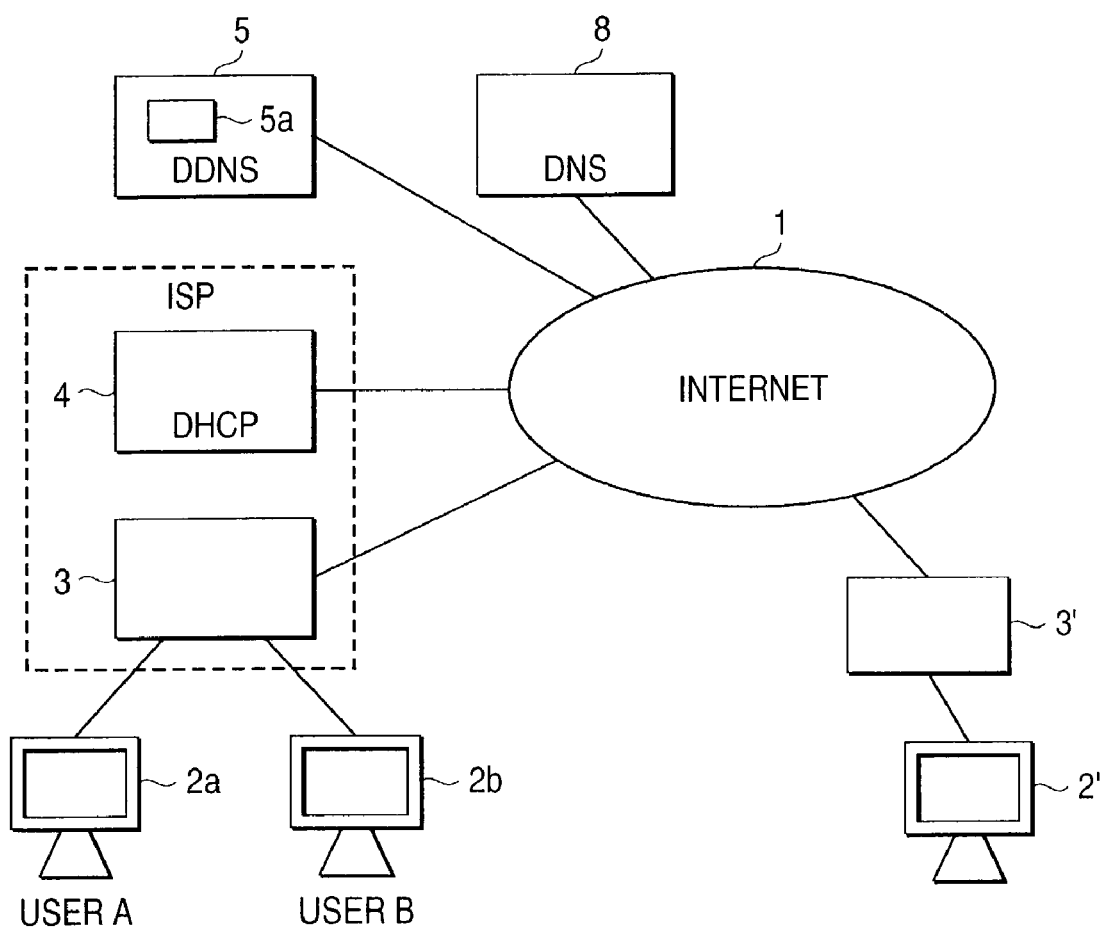
FIG. 6 is a block diagram of a related art DDNS system.
Figures 7A, 7B:
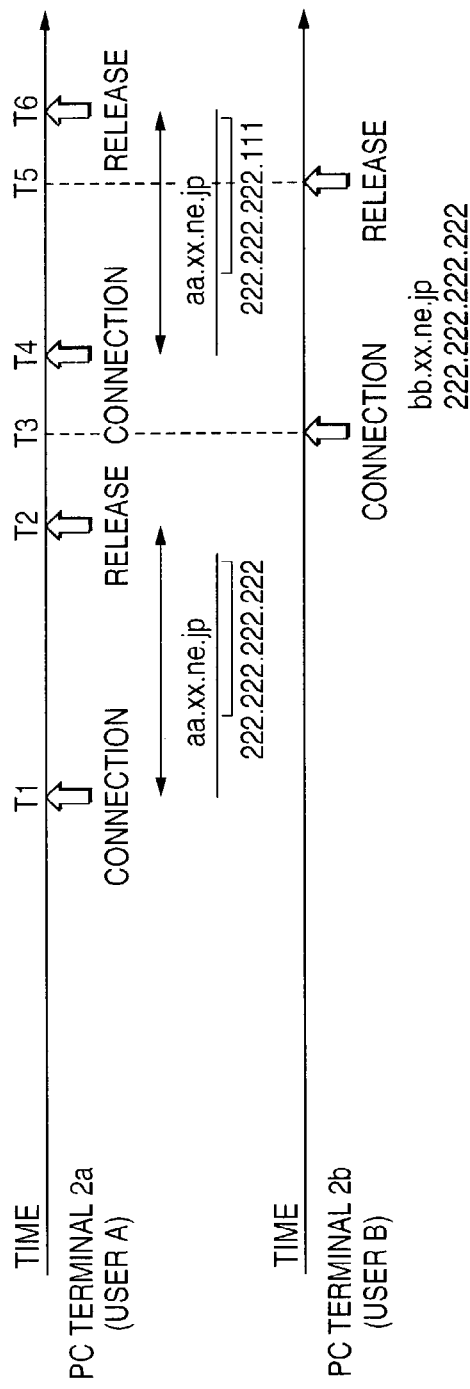
FIG. 7A is a time chart of connection updates in a related art DDNS.
FIG. 7B is a time chart of the registration of a terminal management table and IP address usage by DHCP in a related art DDNS.
Figure 8:
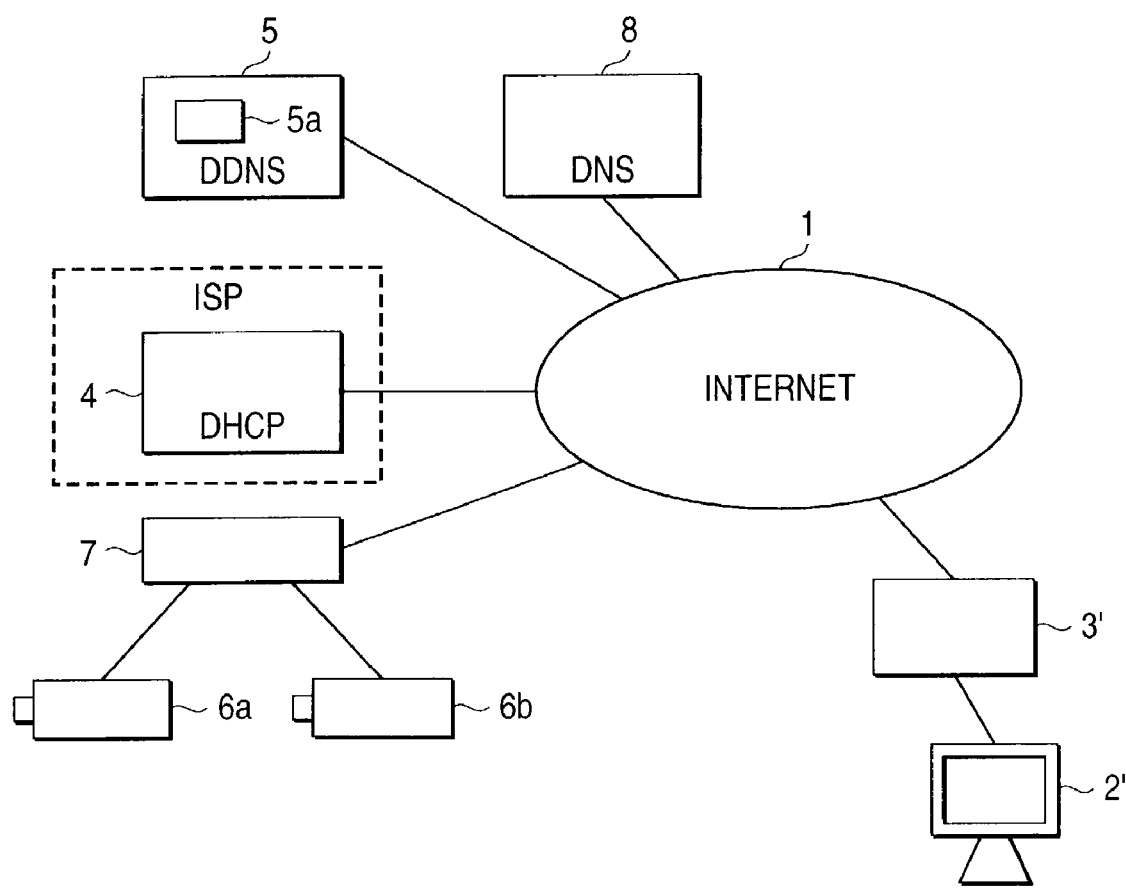
FIG. 8 is a block diagram of a DDNS system comprising a related art terminal connected to the internet via a router.

A DDNS server, a DDNS client terminal, and a DDNS system comprising the DDNS server and the DDNS client terminal will be described. FIG. 1 is a block diagram of a DDNS system according to Embodiment 1 of the invention. FIG. 2A is a block diagram of a PC terminal as a DDNS client terminal according to Embodiment 1 of the invention. FIG. 2B is a block diagram of a DDNS server according to Embodiment 1 of the invention. FIG. 2C is a block diagram of an image pickup terminal as a DDNS client terminal according to Embodiment 1 of the invention. FIG. 3A shows a terminal management table of a DDNS server according to Embodiment 1 of the invention. FIG. 3B shows a DDNS management table of an image pickup terminal according to Embodiment 1 of the invention. FIG. 4 is an IP packet block diagram of a DDNS system according to Embodiment 1 of the invention. FIG. 5A is a flowchart of updating a DDNS server according to Embodiment 1 of the invention. FIG. 5B is a flowchart of accessing a DDNS server according to Embodiment 1 of the invention.

In FIG. 1, a numeral 1 represents the internet, 2, 2' PC terminals, 3, 3' servers as a window of domain such as web servers and mail servers, 4 a DHCP server which assigns an IP address in the domain of the server 3, 5 a DDNS server which converts an access destination domain name to a global IP address on an access from the PC terminals 2, 2'. Numerals 6a, 6b represent image pickup terminals which shoot and transmit images, 7 a router, and 8 a DNS server. A numeral 26' represents browser means of the PC terminal 2'.

In the PC terminal 2 shown in FIG. 2A, a numeral 21 represents the controller of the PC terminal 2 comprising a CPU for loading a control program to perform various control features, 22 DDNS management means for performing processing on a client for DDNS, 23 a memory storing a control program for the CPU of the controller 21, 24 a DDNS management table storing authentication information, a domain name, a global IP address, a port number and update interval information provided in the memory 23, 25 an input/output controller for performing input/output control for communications, and 26 browser means for browsing an HTML document such as a web page. The DDNS management means 22 stores the registered authentication information, domain name, global IP address, port number and update interval information into the DDNS management table 24 as well as periodically transmits an update notice of a global IP address and a domain name to the DDNS server 5 in accordance with the update interval information, and overwrites the global IP address and domain name on an overwrite request thus performing update processing.

In the DDNS server 5 shown in FIG. 2B, a numeral 51 represents the controller of the DDNS server 5 comprising a CPU for loading a control program to perform various control features, 52 a terminal management section for performing processing on a server for DDNS, 53 a memory storing a control program for the CPU of the controller 51, 54 a terminal management table (see FIG. 3A also) storing authentication information, a domain name, a global IP address, a port number and update interval information provided in the memory 53, and 55 an input/output controller for performing input/output communications control. The terminal management section 52 stores authentication information, a domain name, a global IP address, a port number and update interval information into the terminal management table 54 as well as performs the update processing on receiving a regular update notice from a DDNS client terminal. The terminal management section 52 manages a global IP address with a domain name including a sub-domain name (hereinafter a domain name without a sub-domain name and a domain name including a sub-domain name are called domain names).

In the image pickup terminals 6a, 6b in FIG. 2C, a numeral 61 represents the controller of the image pickup terminals 6a, 6b comprising a CPU for loading a control program to perform various control features, 62 DDNS management means for performing processing on a client for DDNS, 63 a memory storing a control program for the CPU of the controller 61, 64 a DDNS management table storing authentication information, a domain name, a global IP address, a port number and update interval information provided in the memory 63, 65 an input/output controller for performing input/output control for communications, 66 a camera driving section for changing the angle or focus of a camera in order to drive the camera to shoot an image, and 67 a web server section. The image pickup terminals 6a, 6b on the internet 1 have a common global IP address also with the router 7. The image pickup terminals 6a, 6b control the camera driving section via the internet 1 in accordance with a camera control request from the unit of another user, and shoot images then transmit the data to the user's terminal. The image pickup terminals 6a and 6b can be desirably used by separate users. Thus, it is necessary to allow an external access to each of the image pickup terminals 6a and 6b.

Next, the terminal management table 54 and the terminal management section 52 of the DDNS server 5 will be described. FIG. 3 shows the details of the terminal management table 54. A numeral $54_1$ represents authentication information stored in the terminal management table 54 used to authenticate whether an access is an authorized access, $54_2$ a domain name, $54_3$ a global IP address of the domain, and $54_4$ the port number of a terminal.

As the authentication information $54_1$, the MAC address of a unit whose privacy is to be protected is preferable because it is safely and readily used. The MAC address is a value inherent to the product and is a unique number comprising a manufacturer code and a serial number. In the example of FIG. 3, the MAC addresses '11:22:33:44:55:66,' '22:33:44:55:66:77,' and '33:44:55:66:77:88,' of the image pickup terminals 6a, 6b and PC terminal 2 respectively are employed as the authentication information $54_1$. These addresses are written into the option of an IP header shown in FIG. 4 for transmission and compared with the authentication information $54_1$ stored in advance to check whether the access is an authorized access.

The domain name 542 in Embodiment 1 is a domain name registered automatically by the DDNS server 5 or manually through input by a use of the DDNS server. A domain name such as '11.xx.ne.jp' including a sub-domain name is stored in association with each of the image pickup terminals 6a, 6b and the PC terminal 2. The global IP address $54_3$ is dynamically assigned by the DHCP server 4. For example, the global IP address $54_3$ of the router 7 and the image pickup terminals 6a, 6b connected thereto is assigned to '222.222.222.222' in common at a point in time. The DHCP server 4 chooses a global IP address from among the global IP addresses '222.222.111.001' through '222.222.222.300' and assigns the global IP address $54_3$ to a requesting unit.

As the port number $54_4$, '800,' '8000' and '888' are assigned to the programs of the image pickup terminals 6a, 6b and the PC terminal 2 respectively. A port number is written into the destination port numbers in the IP packet shown in FIG. 4 and transmitted/received between the internet and a router to allow the target unit in the router 7 to be directly identified from outside.

For example, in communications where the image pickup terminal 6a is directly identified, an IP packet with the global IP address of the router 7 and port number '800' of the image pickup terminal 6a written into its header is transmitted over the internet. The router 7 receives the packet and uses the masquerade feature (port forward feature) of the router 7 to transfer the IP packet to the port number '800' of the image pickup terminal 6a.

In the DDNS server 5 according to Embodiment 1, the terminal management section 53 manages the terminal management table 54 and updates the global IP address $54_3$, port number $54_4$ and domain name $54_2$ when an update notice is transmitted from the DDNS client terminal. First, the global IP address update processing by the terminal management section 52 as a characteristic of the DDNS will be described referring to the update processing flowchart in FIG. 5A.

In FIG. 5A, the terminal management section 52 checks whether an update notice transmitted from the DDNS client terminal includes an IP address overwrite request (step 1). In case the update notice does not include an IP address overwrite request, the terminal management section 52 performs another processing (such as change of a sub-domain name) (step 2). In case the update notice includes an IP address overwrite request, the terminal management section 52 checks whether the same global IP address is present in the terminal management table 54 (step 3).

In case the same global IP address is not present in step 3, the terminal management section 52 permits overwriting of the global IP address (step 4). In case the same global IP address is present in step 3, the terminal management section 52 checks whether the port number of the update notice is the same as the port number $54_4$ of the terminal management table (step 5). In case the port number of the update notice is the same as the port number $54_4$, the terminal management section 52 inhibits overwriting of the global IP address (step 6). Otherwise the terminal management section 52 permits overwriting of the global IP address (step 4). It is thus possible to inhibit overwriting of a global IP address in case a registration request or update request for a combination of a global IP address and a port address previously registered is received from a terminal other than that identified with such a combination. In case a registration request or update request for a combination of a global IP address and a port address previously registered is received from a terminal identified with such a combination via authentication information such as a MAC address, overwriting of the global IP address may be permitted.

Next, the processing by the DDNS server 5, that is, the processing of an access to the image pickup terminal 6a from the PC terminal 2' according to Embodiment 1 via the network 1 will be described. The domain name and port number of the image pickup terminal 6a are input from browser means 26' (see FIG. 1) of the PC terminal 2'. The browser means 26' transmits an IP packet for a global IP address inquiry request including the input domain name to the DNS server 8 (step 11). The DNS server 8 transmits the IP packet to the DDNS server 5 in order to make a global IP address inquiry request, and the DDNS server 5 receives the IP packet. The DDNS server 5 references the terminal management table 54 and extracts the global IP address $54_3$ from the domain name (step 12). The DDNS server 5 transmits the global IP address $54_3$ to the DNS server 8 which made the global IP address inquiry request. The DNS server 8, receiving the global IP address $54_3$, transmits the IP packet to the PC terminal 2' as a source of the inquiry.

The browser means 26 of the PC terminal 2', receiving the global IP address 543 transmitted from the DNS server 8, makes an access using the global IP address $54_3$ and the input port number $54_4$ (step 13). The IP packet transmitted from the PC terminal 2' is received by the router 7, which transfers the IP packet to the image pickup terminal 6a in accordance with the port number $54_4$ (step 14).

Thus, the DDNS system according to Embodiment 1 associates a port number as well as a domain name to a global IP address. The DDNS system uses a combination of a global IP address and a port number to avoid double registration. Thus it is possible to register a plurality of terminals having the same IP address such as terminals locally connected to a router so that separate accesses to the terminals may be allowed, and perform data updates. Further, double registration of a terminal to which an ISP has dynamically assigned a global IP address by using DHCP is allowed.

Next, a DDNS management table 64 and DDNS management means of a DDNS client terminal will be described. As shown in FIG. 3B, the DDNS management table 64 of the image pickup terminal 6a stores authentication information 64, such as a MAC address, a domain name $64_2$, a port number $64_4$, and an update interval $64_5$. Note that, in case the image pickup terminal 6a is connected to the router 7, the global IP address is managed by the router 7 and thus is not stored in the image pickup terminal 6a. While not shown, the configuration is the same for the DDNS management table 64 of the image pickup terminal 6b and the PC terminal 2.

The update interval $64_5$, or a regular update interval, can be set to the image pickup terminal 6a, 6b and the PC terminal 2, for example 10 minutes to the image pickup terminal 6a, 6b and one day to the PC terminal 2. The DDNS management means 22, 62 each periodically transmits an update request packet including a port number and a MAC address to the DDNS server 5 at preset intervals in accordance with this setting. The router 7 receives the packet and changes its header to the current global IP address assigned by the DHCP server 4 and transmits the resulting packet to the DDNS server 5.

The DDNS server 5, receiving the update request periodically transmitted from the image pickup terminal 6a, updates the terminal management table 54. The global IP address of each of the image pickup terminals 6a, 6b externally recognized is the same as that of the router 7, which global IP address is assigned to the router 7 by the DHCP server 4. The global IP address is stored into the router 7 when it is assigned by the DHCP server 4 and, on a second assignment by the DHCP server 4, is overwritten to a new global IP address.

Next, the processing of updating a DDNS server by a DDNS client terminal will be described. As shown in FIG. 1 and FIG. 3A, as an update interval is input, for example 10 minutes, into the DDNS management table 64 of the image pickup terminal 6a, 6b, the DDNS management means 62 extracts a port number and a MAC address as authentication information from the DDNS management table 64 every 10 minutes, and transmits an update notice including the port number, MAC address and overwrite request to the DDNS server 5. The router 7 receives the update notice and changes its header to the current global IP address assigned to the router 7 by the DHCP server 4 and transmits the resulting update notice to the DDNS server 5.

The DDNS server 5 authenticates the update notice and checks whether the update notice includes a global IP address overwrite request. In case the update notice is not a global IP address overwrite request, the DDNS server 5 performs another processing. In case the update notice is a global IP address overwrite request, the terminal management section 52 checks whether the same global IP address '222.222.222.222' is present in the terminal management table 54.

In case the same global IP address '222.222.222.222' is not present, the terminal management section 52 permits overwriting of the global IP address. In case the same global IP address '222.222.222.222' is present, the terminal management section 52 checks whether the port number '800' of the update notice is the same as the port number $54_4$ of the terminal management table 54. In case they are the same, the terminal management section 52 inhibits overwriting of the global IP address. In case they are not same, the terminal management section 52 permits overwriting of the global IP address. That is, the terminal management section 52 inhibits any change where an IP address and a port number is identical, and permits a change in the remaining cases. As a result, it is possible to inhibit overwriting of a global IP address in case a registration request or update request for a combination of a global IP address and a port address previously registered is received from a terminal other than that identified with such a combination. In case a registration request or update request for a combination of a global IP address and a port address previously registered is received from a terminal identified with such a combination by authentication information such as a MAC address, overwriting of the global IP address may be permitted.

The processing of an access to the image pickup terminal 6a from the PC terminal 2' according to Embodiment 1 via the network 1 will be described. The domain name '11.xx.ne.jp' and the port number '800' are input to browser means 26' of the PC terminal 2'. The browser means 26 makes an inquiry about the global IP address name to a DNS server 8 where the input domain name is previously registered. The DNS server 8, receiving the inquiry, makes an inquiry to the DDNS server 5 about the global IP address corresponding to the domain name inquired about by the PC terminal 2'. The DDNS server 5 extracts a domain name '11.xx.ne.jp' from the IP packet transmitted, references the terminal management table 54, and extracts an IP address '222.222.222.222' from the domain name '11.xx.ne.jp' The domain name '11.xx.ne.jp' includes a sub-domain name as mentioned earlier. The DDNS server 5 transmits to the DNS server 8 a response to the inquiry including the IP address '222.222.222.222'. The DNS server 8 received the response, based on this response, transmits an IP packet as a response to the inquiry including the IP address '222.222.222.222' of the image pickup terminal 6a to the PC terminal 2'.

The browser means 26' of the PC terminal 2', receiving the address information ('222.222.222.222') of the image pickup terminal 6a from the DDNS server 5 via the DNS server 8, accesses the input port number '800' and the IP address '222.222.222.222:800' of the image pickup terminal 6a. The router assigned the IP address '222.222.222.222' receives the access from the PC terminal 2' and performs port forwarding in accordance with the received port specification (port number '800') to transfer the IP packet.

Thus, the DDNS system according to Embodiment 1 associates a port number as well as a global IP address to a domain name. The DDNS system uses a combination of a global IP address and a port number to avoid double registration. Thus it is possible to register a plurality of terminals having the same IP address such as terminals locally connected to a router so that separate accesses to the terminals may be allowed, and perform data updates. Further, double registration of a terminal to which an ISP has dynamically assigned a global IP address by using DHCP is allowed.

Embodiment 2

Figure 9:
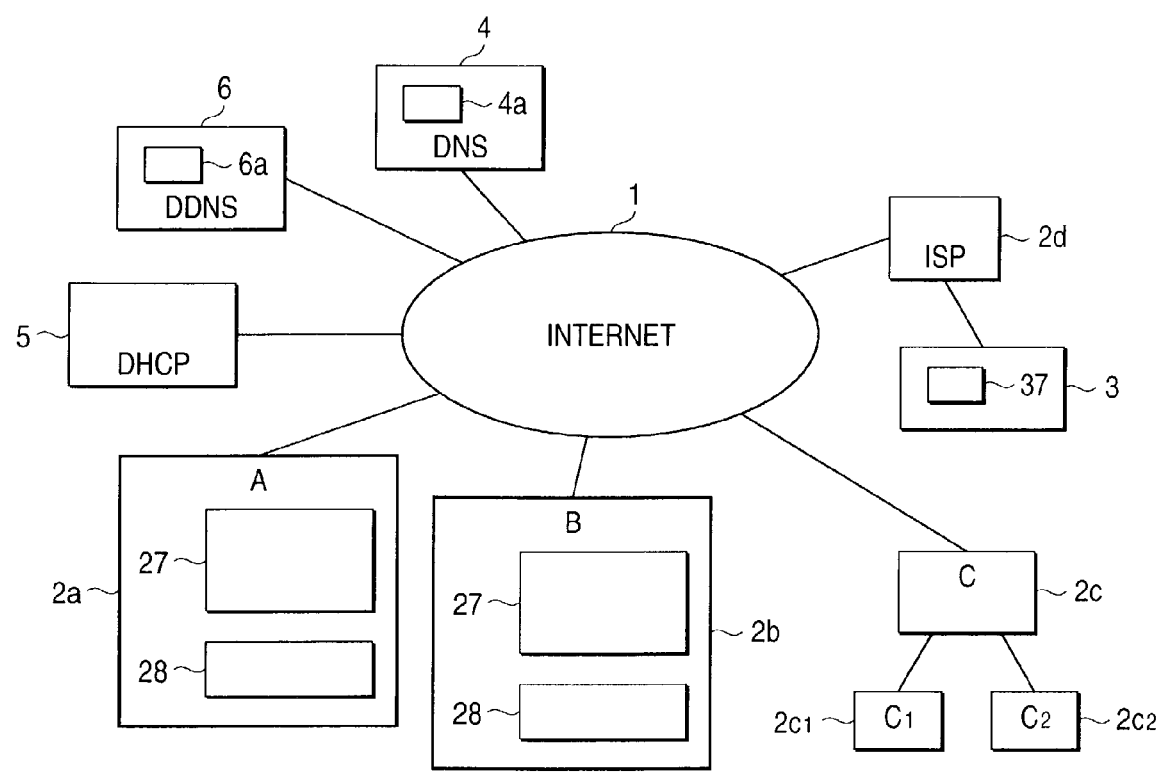
FIG. 9 is a block diagram of a network system using DDNS and DHCP according to Embodiment 2 of the invention.
Figure 10A:
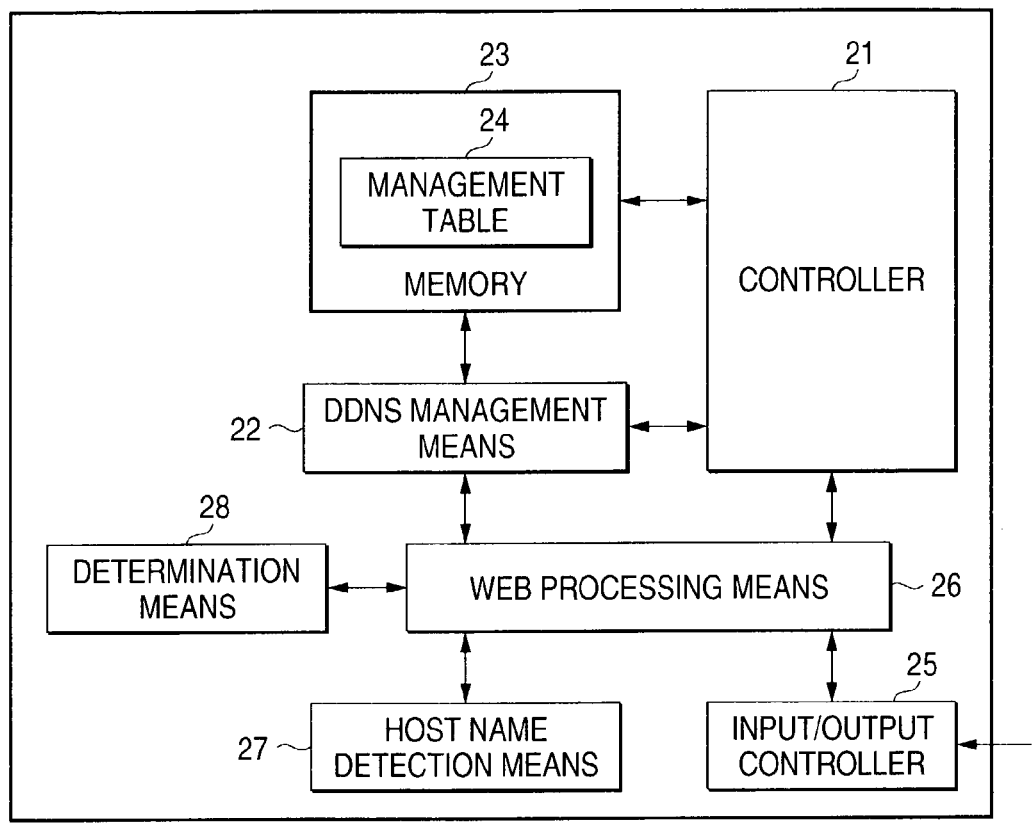
FIG. 10A is a block diagram of a web server terminal according to Embodiment 2 of the invention.
Figure 10B:
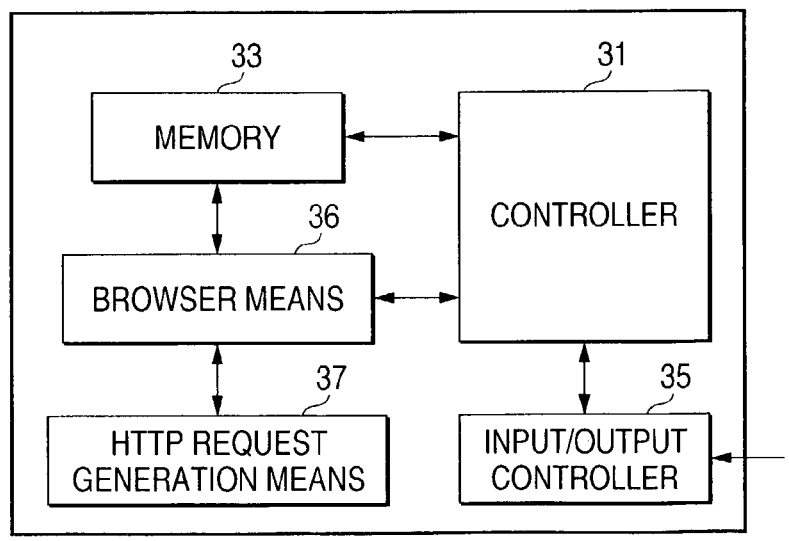
FIG. 10B is a block diagram of a web client terminal according to Embodiment 2 of the invention.
Figure 12:
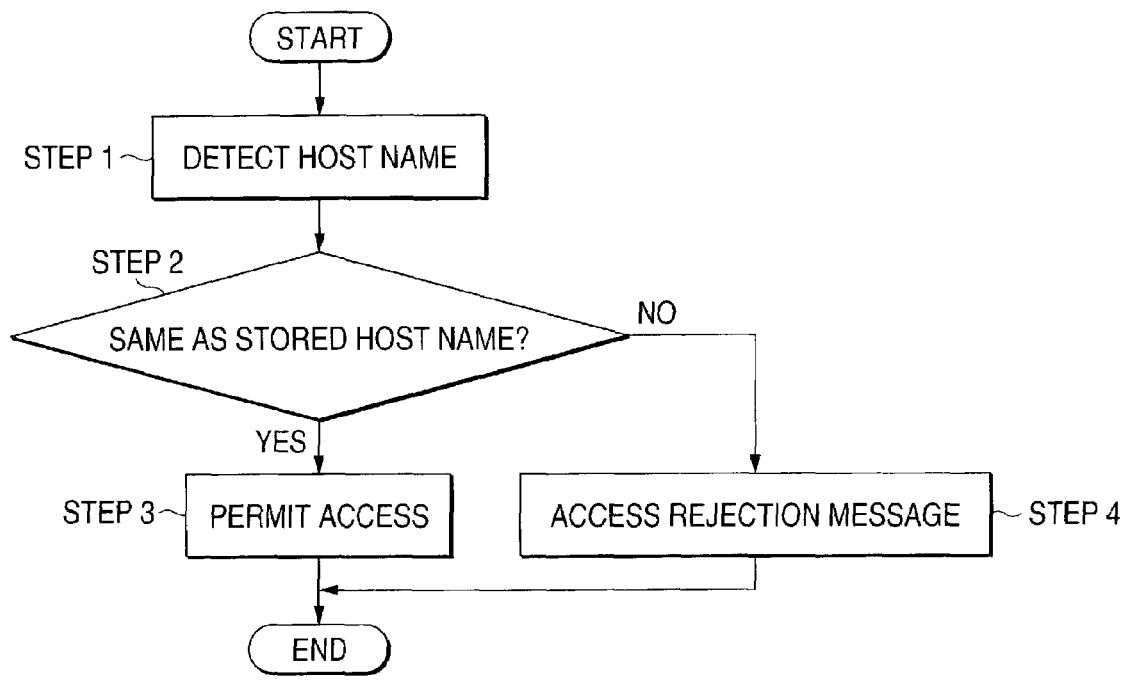
FIG. 12 is a flowchart showing control of an access to the web server terminal according to Embodiment 2 of the invention.

A network system using DDNS and DHCP and its access control method according to Embodiment 2 of the invention will be described. FIG. 9 is a block diagram of a network system using DDNS and DHCP according to Embodiment 2 of the invention. FIG. 10A is a block diagram of a web server terminal according to Embodiment 2 of the invention. FIG. 10B is a block diagram of a web client terminal according to Embodiment 2 of the invention. FIG. 11A is a main section of the management table of a web server terminal according to Embodiment 2 of the invention. FIG. 11B is a block diagram of an access request according to Embodiment 2 of the invention. FIG. 12 is a flowchart showing control of an access to the web server terminal according to Embodiment 2 of the invention.

In FIG. 9, a numeral 1 represents the internet, 2a a web server terminal A, 2b a web server terminal B, 2c a router C, 2c₁ a web server terminal $C_1$, 2c₂ an web server terminal $C_2$, 2d a web server terminal, 3 a web client terminal with a browser mounted, 4 a DNS server, 4a a DNS management table, 5 a DHCP server, 6 a DDNS server which communicates an IP address dynamically changing in correspondence with a host name to a web client so as to perform access support, and 6a a management table. Details of these components are basically the same as those in the related art. The DNS server 4, DHCP server 5 and DDNS server 6 may be provided in various forms in various locations on the network.

Configuration of the web server terminal will be described referring to FIGS. 9 and 10A. A numeral 21 represents the controller of the web server comprising a CPU for loading a control program to perform various control features, 22 DDNS management means for performing processing on a server for DDNS, 23 a memory storing a control program for the CPU of the controller 21, 24 a management table storing authentication information, a host name, an IP address, and a port number provided in the memory 23. A numeral 25 represents an input/output controller for performing input/output communications control, and 26 web processing means such as httpd for processing a request such as one for transmission of an HTML file transmitted from the web client terminal 3, 27 host name detection means for extracting a host name from a data area on receiving an access request transmitted from a web client terminal 3, 28 determination means for comparing the host name detected by the host name detection means with the host name stored in the management table and checking whether they match each other to determine whether to permit or inhibit the access.

The DDNS management means 22 stores authentication information, a host name, an IP address and a port number in the management table 24. When the DHCP server 5 has assigned an IP address, the DDNS management means 22 communicates the IP address to the DDNS server 6. A host name stored in the DDNS management table 24 is registered to the DDNS server 6 by the DDNS management means 22 in advance and acquired as a registration name by the DDNS management means 22 from the DDNS server 6. The management table 24 shown in FIG. 11A shows a host name 24a and an IP address 24b used for an access request. Authentication information and a port number are not shown in the table. The host name here refers to an access name comprising a host name in the narrow sense as a terminal name and a domain name and, in some cases, a sub-domain name as well. The host names in FIGS. 11A and 11B is 'tarou.miemasu.net' and 'hanako. miemasu.net', where 'tarou' and 'hanako' are host names in the narrow sense, and 'miemasu.net' is a common domain name. On receiving an access request from the web client terminal 3, the host name detection means 27 detects a host name from 'Host' in accordance with the HTTP request header method 'GET' as shown in FIG. 11B. The determination means 28 determines whether to permit or inhibit the access as shown in FIG. 4.

In FIG. 12, the host name detection means 27 detects a host name from the HTTP request header (step 1). For example, the incoming packet is attempting to access the IP address '1.1.1.1' and the host name 'http://tarou.miemasu.net', the host name detection means 27 extracts 'tarou.miemasu.net' from 'Host' by using the method 'GET' shown in FIG. 11B in step 1.

Then the determination means 28 compares the host name detected by the host name detection means 27 with the registered host name 'tarou.miemasu.net' stored in the management table 24 and determines whether they are the same (step 2).

When the registered host name matches the detected host name, the determination means 28 permits an access (step 3) and the web processing means 26 starts communications. In case the registered host name does not matches the detected host name, the determination means 28 rejects the access (step 4) and the web processing means 26 returns an HTML web page 'Connection failed' to the browser.

A web server terminal of Embodiment 2 registers therein a host name in advance. Even in case a DDNS server assigns the same IP address to two host names, the web server terminal detects a host name set to the HTTP request included in an access request from the browser to permit communications only when an access attempt is made thereto. It is thus possible to readily and reliably prevent erroneous connection. Information leakage due to erroneous connection is prevented thereby enhancing security.

Next, a web client according to Embodiment 2 will be described. In FIG. 10B, a numeral 31 represents the controller of the web client terminal 3 comprising a CPU for loading a control program to perform various control features, 33 a memory storing a control program for the CPU of the controller 31, 35 an input/output controller for performing input/output control for communications, 36 browser means for browsing an HTML document such as a web page, and 37 HTTP request generation means for generating an HTTP request in making an access request to a web server terminal.

The browser means 36 makes an inquiry about the IP address corresponding to a host name to a DSN server 4 in accessing a web server terminal. The DNS server 4 makes an inquiry about the IP address to the DDSN server 6, thus allowing the IP address to be acquired. For example, in accessing a web server terminal having a host name stored in the memory 33, the HTTP request generation means 37 generates an HTTP request and the browser means 36 transmits an IP packet where this HTTP request is set to the web server terminal over the internet. When an IP address acquired by ways of the DNS server 4 and the DDNS server 6 is received by the web server terminal, the web server terminal checks the host name in the HTTP request to determine whether the access is an authorized access, and permits or inhibits the access.

Details of the HTTP request are shown in FIG. 3B. The HTTP request generation means 37 sets an URI (Universal Resource Identifier) and version information 'HTTP1.0' just after the method 'GET' and writes a host name just after 'Host' to generate an HTTP request header, in accordance with the protocol HTTP. In HTTP1.1, it is mandatory that the HTTP request generation means 37 set a host name, which is automatically written.

A web client terminal according to Embodiment 2 sets a target host name in an access request on HTTP request generation means. Thus comparison between host names as well as IP addresses is possible on the web server terminal, which makes it possible to readily and reliably prevent erroneous connection.

Next, the flow of accessing a web client terminal to a web server terminal in a network system where a web server terminal and a web client terminal according to Embodiment 2 are connected to the internet will be described.

An access request to a web server terminal is transmitted from a web client terminal via a network. An HTTP request used by the web server terminal to detect a host name is set to this access request. An IP header where an IP address corresponding to the host name acquired by using a DDNS server and a DNS server is assigned is appended to a transmitted packet. The resulting IP packet is transmitted to the web server terminal.

In the web server terminal, host name detection means detects a host name set to an HTTP request for requesting an access, and determination means compares this host name with the registered host name, and permits the access only when the host names are the same.

With this access control method, it is possible to permit an access only when the host names match each other, without configuring a special system. It is thus possible to readily and reliably prevent erroneous connection even in the presence of double registration of an IP address. Information leakage due to erroneous connection is prevented thereby enhancing security.

What is claimed is:

1. A Dynamic Domain Name System (DDNS) server connected to a DDNS client terminal, comprising:
a table comprising a domain name, a global IP address and a port number of the DDNS client terminal; and
a terminal management section that manages said table,
wherein the terminal management section receives from the DDNS client terminal a request for writing the global IP address of the DDNS client terminal stored in the table, the request including a new global IP address and a new port number corresponding to the new global IP address, determines whether the new global IP address and the new port number are stored in the table, permits writing of the global IP address when it is determined that the new global IP address is stored and the new port number is not stored in the table, and writes the new global IP address and the new port number in the table, and wherein
authentication information is stored and said terminal management section compares the authentication information with authentication information in a header of the request to write the global IP address to determine whether the access of the request to overwrite the global IP address is an authorized access.

2. A DDNS server according to claim 1, wherein said table stores said authentication information.

3. A DDNS server according to claim 2, wherein said authentication information comprises a MAC address of the DDNS client terminal.

4. A DDNS server according to claim 1, wherein said terminal management section periodically receives an update notice from the DDNS client terminal.

5. A Dynamic Domain Name System (DDNS) system comprising:
a DDNS client terminal including:
a DDNS management table storing a domain name, a global IP address, and a port number of the DDNS client terminal; and
a DDNS manager that manages the DDNS management table and to transmit to a DDNS server a request for writing the global IP address of the DDNS client terminal;
and
a DDNS server including:
a table comprising the domain name, global IP address, and the port number of said DDNS client terminal; and
a terminal management section that manages said table,
wherein the terminal management section receives from the DDNS client terminal the request for writing the global IP address of the DDNS client terminal stored in the table, the request including a new global IP address and a new port number corresponding to the new global IP address, and determines whether the new global IP address and the new port number are stored in the table, permits writing of the global IP address when it is determined that the new global IP address is stored and the new port number is not stored in the table, and writes the new global IP address and the new port number in the table, wherein authentication information is stored and said terminal management section compares the authentication information stored in said table with authentication information in a header of the request to write the global IP address to determine whether the access of the request to overwrite the global IP address is an authorized access.

6. A DDNS system according to claim 5, wherein a DDNS management table stores authentication information, said DDNS manager writes the authentication information into a header before transmission when said DDNS client terminal transmits to the DDNS server the request for writing the global IP address, and said terminal management section of said DDNS server compares the authentication information stored in said table with that in the header to determine whether the access is an authorized access.

7. A DDNS system according to claim 6, wherein said authentication information comprises a MAC address of the DDNS client terminal.

8. A DDNS system according to claim 5, wherein said terminal management section periodically receives an update notice from the DDNS client terminal.

9. The DDNS server according to claim 1, wherein the terminal management section permits writing of the global IP address when it is determined that the new global IP address of the DDNS client terminal is not stored in the table.

10. The DDNS server according to claim 1, wherein the terminal management section inhibits writing of the global IP address when it is determined that the new global IP address and the new port number are stored in the table.

11. A Dynamic Domain Name System (DDNS) client connected to a DHCP server and a DDNS server through a router, the router being assigned a global IP address by the DHCP server, the DDNS client comprising:

a memory that stores a port number and a MAC address of the DDNS client; and an update requester that requests the DHCP server to update a global IP address and a port number by transmitting to the DHCP an update request including the port number and the MAC address of the DDNS client stored in the memory, wherein the router relays the update request using the global IP address assigned by the DHCP server to the DDNS server, wherein the terminal management section receives from the DDNS client terminal a request for writing the global IP address of the DDNS client terminal stored in the table, the request including a new global IP address and a new port number corresponding to the new global IP address, determines whether the new global IP address and the new port number are stored in the table, permits writing of the global IP address when it is determined that the new global IP address is stored and the new port number is not stored in the table, and writes the new global IP address and the new port number in the table, and wherein said table stores authentication information and said terminal management section compares the authentication information stored in said table with authentication information in a header of the request to write the global IP address to determine whether the access of the request to overwrite the global IP address is an authorized access.

* * * * *

UNITED STATES PATENT AND TRADEMARK OFFICE
CERTIFICATE OF CORRECTION

| | | |
|---|---|---|
| PATENT NO. | : 7,529,810 B2 | Page 1 of 1 |
| APPLICATION NO. | : 10/390238 | |
| DATED | : May 5, 2009 | |
| INVENTOR(S) | : Hironori Goto, Akihiro Nawata and Michihiro Muta | |

It is certified that error appears in the above-identified patent and that said Letters Patent is hereby corrected as shown below:

Column 8, line 34 please delete "542" and insert therefor --$54_2$--

Column 10, line 7 please delete "64" and insert therefor --$64_1$--.

Column 11, line 46 please delete "aport" and insert therefor --a port--.

Signed and Sealed this

Seventh Day of September, 2010

David J. Kappos
*Director of the United States Patent and Trademark Office*